United States Patent [19]

Reiss

[11] Patent Number: 4,477,267
[45] Date of Patent: Oct. 16, 1984

[54] MOLECULAR SIEVE ZEOLITE FOR PRODUCING HYDROGEN BY PRESSURE VARIATION ADSORPTION TECHNIQUE

[75] Inventor: Gerhard Reiss, Leverkusen, Fed. Rep. of Germany

[73] Assignee: Bayer Aktiengesellschaft, Leverkusen, Fed. Rep. of Germany

[21] Appl. No.: 434,299

[22] Filed: Oct. 14, 1982

[30] Foreign Application Priority Data

Nov. 5, 1981 [DE] Fed. Rep. of Germany ....... 3143993

[51] Int. Cl.$^3$ ............................................. B01D 53/04
[52] U.S. Cl. ........................................... 55/68; 55/75
[58] Field of Search .................. 55/25, 26, 58, 62, 68, 55/75

[56] References Cited

U.S. PATENT DOCUMENTS

| 2,882,244 | 4/1959 | Milton ................................ 55/75 X |
| 3,111,387 | 11/1963 | Avery et al. ............................. 55/33 |
| 3,176,444 | 4/1965 | Kiyonaga ................................. 55/26 |
| 3,564,816 | 2/1971 | Batta ..................................... 55/26 |
| 3,726,865 | 4/1973 | Bickel et al. ..................... 424/246 X |
| 3,773,690 | 11/1973 | Heinze et al. ..................... 252/455 Z |
| 3,808,773 | 5/1974 | Reyhing et al. ..................... 55/33 X |
| 3,986,849 | 10/1976 | Fuderer et al. .......................... 55/25 |
| 4,077,779 | 3/1978 | Sircar et al. ............................. 55/25 |
| 4,234,322 | 11/1980 | De Meyer et al. ...................... 55/18 |

FOREIGN PATENT DOCUMENTS

| 199621 | 9/1958 | Austria . |
| 8619 | 3/1980 | European Pat. Off. . |
| 2656633 | 6/1977 | Fed. Rep. of Germany . |

OTHER PUBLICATIONS

Breck, Zeolite Molecular Sieves, 1974, p. 613.

Primary Examiner—Robert H. Spitzer
Attorney, Agent, or Firm—Sprung, Horn, Kramer & Woods

[57] ABSTRACT

In the increase of the hydrogen content of a gas rich in hydrogen by contacting the gas with a zeolite which selectively adsorbs the gases other than hydrogen to leave the non-adsorbed gas enriched in hydrogen, and then desorbing the adsorbed gases from the zeolite, the improvement which comprises employing as said zeolite Ca-zeolite X granulate in which at least about 50% of the Na initially present in the zeolite has been replaced by calcium.

7 Claims, 2 Drawing Figures

4-Adsorber Pressure Swing Apparatus (schematic)

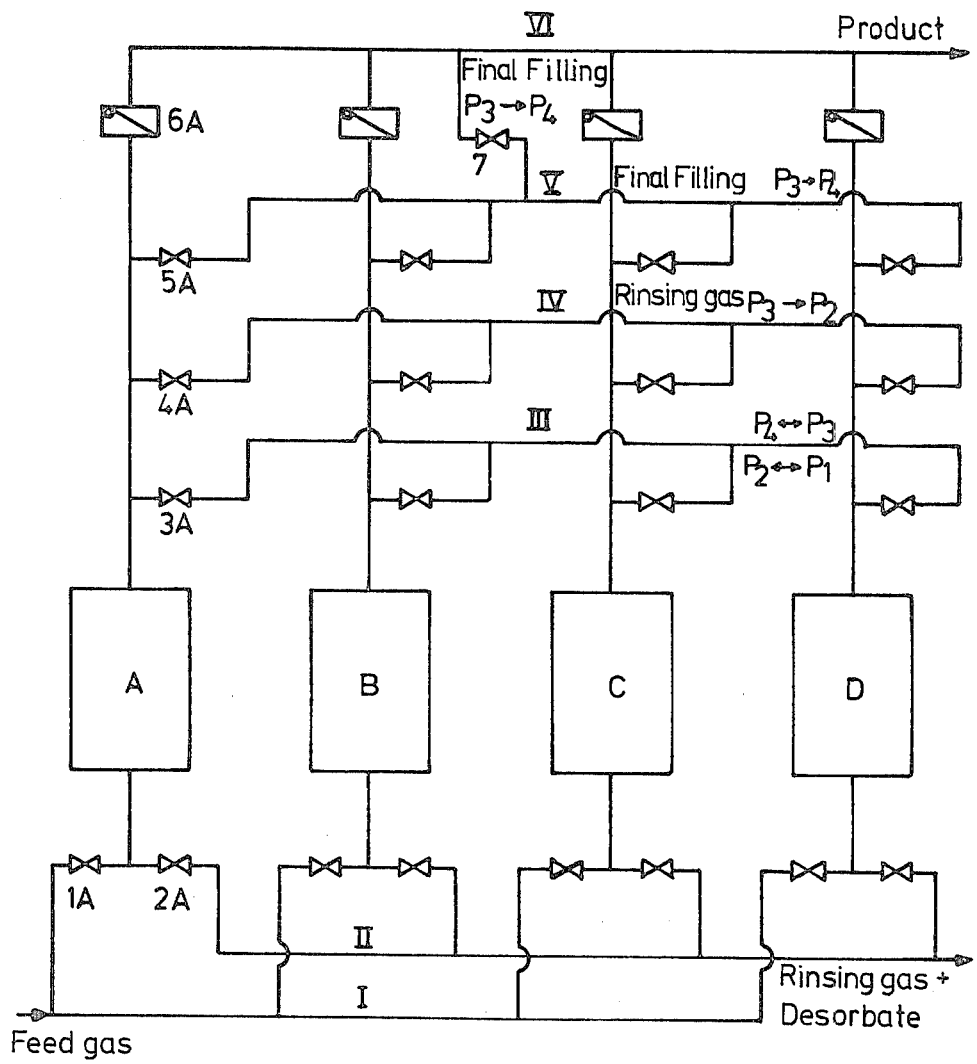
FIG. 1 4-Adsorber Pressure Swing Apparatus (schematic)

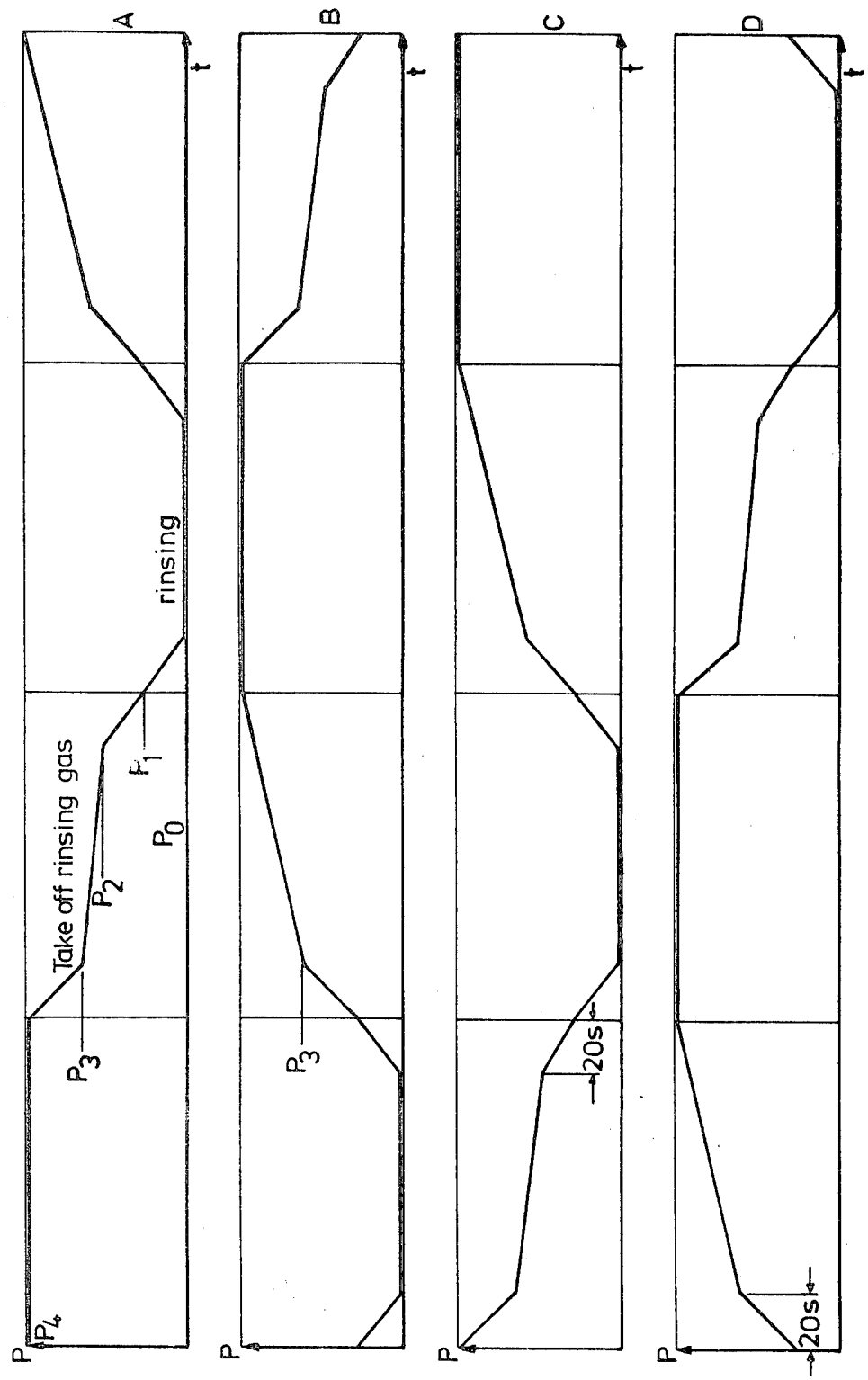
FIG. 2 Pressure-time diagramm of a 4-adsorber PSA device

MOLECULAR SIEVE ZEOLITE FOR PRODUCING HYDROGEN BY PRESSURE VARIATION ADSORPTION TECHNIQUE

This invention relates to the use of granulated zeolite X containing a relatively high percentage of calcium for producing hydrogen-rich gases by the pressure variation process.

The production of high purity hydrogen from gases rich in hydrogen is being carried out to an increasing extent by the technique of pressure variation adsorption (PVA). The starting gas used for PVA-separation is selected from refinery gases, coke-oven gas or a hydrogen gas prepared by reforming oil, naphtha or natural gas, followed by conversion. This gas contains approximately 70 to 75% of $H_2$, 1 to 3% of CO, 2 to 5% of $CH_4$, 15 to 17% of $CO_2$ and, where natural gas is used as the starting gas, also 1 to 5% of nitrogen.

In PVA installations, the impurities are adsorbed on solid adsorbents under gas pressures of from 15 to 30 bars and at temperatures of from $+10°$ to $+30°$ C. and desorbed under pressures of from 1 to 2 bars (abs). Desorption is carried out with a rinsing gas, i.e. pure hydrogen. The economy of the PVA-process presupposses a high adsorption capacity of the adsorbent for the various impurities (adsorbates) and, even more importantly, a high desorption rate for a small quantity of rinsing gas.

In order to achieve an optimum here, specific adsorbents are selected for the various adsorbates, i.e. PVA-adsorbers for the production of hydrogen generally comprise a multiple-layer bed. Drying is carried out with aluminum oxide (activated $Al_2O_3$) or with silica gel and the removal of $CO_2$ and $CH_4$ with activated carbon, some of the CO being removed as well.

Molecular sieve zeolites are used for removing the remaining CO and all the nitrogen. These zeolites are particularly effective in adsorbing substances of which the molecules are polar. Since $N_2$ has a quadrupole moment and since CO is easy to polarize $N_2$ and CO are best adsorbed on molecular sieve zeolites.

In PVA-processes, product losses are incurred through the rinsing gas and through the process of expansion from the adsorption pressure to the rinsing gas pressure. The expansion losses are smaller, the smaller the volume of the adsorber. This means that the desorption rate of the adsorbent must be related to its volume and not to its weight.

In the meantime, several processes have been successfully developed with a view to minimizing expansion gas losses. To this end, several adsorbent beds are used, one adsorber being relieved of pressure in several stages in cocurrent to the adsorption process and, at the same time, several adsorbers being re-pressurized in countercurrent to the adsorption process (cf. DE-OS No. 26 24 346). Pure hydrogen for desorbing the impurities is obtained from one or two expansion stages. In PVA-installations for producing hydrogen, zeolites of the CaA type, i.e. zeolites having a pore diameter of 5 Å, have hitherto always been used as the molecular sieve zeolites.

In some cases, however, zeolites of the CaA type are not entirely satisfactory in regard to their separation effect. Attempts have been made to replace them with an agent which does not have any of these disadvantages.

The present invention provides a process for separating off gases rich in hydrogen by the pressure variation adsorption technique which is characterized in that Ca-zeolite X granulate, in which at least about 50% of the sodium present in the zeolite has been replaced by calcium, is used as the zeolitic filling for the adsorber beds.

It has surprisingly been found that zeolite X in the Ca-form is a much better separating agent than Zeolite CaA.

Zeolite X in the sodium form is a molecular sieve type which has already been used on a large scale in adsorption installations for "sweetening" natural gas or removing $H_2O$ and $CO_2$ from the intake air of air-cryogenic separation plants and, because of this, has already been investigated in detail and has been found to be unsuitable for use in PVA-installations for producing hydrogen on account of its poor adsorption capacity, for example for nitrogen.

According to Table 1, Na-zeolite X only has about 50% of the $N_2$-capacity of Ca-zeolite A. It is, therefore surprising that by replacing some of the Na in Na-zeolite X with Ca the capacity of the resulting zeolite can be increased by a factor of more than 3.5.

It has now been found that the replacement of NaX by Ca in a small quantity of only up to about 0.5 CaO/$Al_2O_3$ is insufficient to produce a significant increase in the purifying effect in PVA-hydrogen installations and that, it is only beyond a level of about 0.5CaO/$Al_2O_3$ that a molecular sieve zeolite X can be used with advantage over the hitherto usual Ca-zeolite A.

The process according to the invention, i.e. the production of hydrogen, is carried out by methods known per se of the type described for example in U.S. Pat. No. 3,564,816 or in DE-OS No. 28 23 211.

The zeolite material is produced by methods known per se (cf. for example DE-PS Nos. 2,025,893 and 2,016,838).

The suitability of the zeolites was verified in a preliminary test and was checked in a semi-technical PVA-test. In the preliminary test, the quality of the zeolite was examined for the adsorption and desorption steps. To this end, a mixture of $H_2$ and adsorbate flowed through an 1800 mm zeolite packing under a pressure of 1 bar/25° C. at a rate of flow of 3 cm/s (based on empty space). Before the test, all the zeolites had been regenerated with dry air at 300° C. so that the residual $H_2O$ load amounted to less than 1% by weight. Desorption of the intitial $N_2$ load was carried out in the test column using pure hydrogen. Adsorption was terminated at an outlet concentration of 0.2% by volume of the adsorbate, after which hydrogen was passed through the zeolite packing at a rate of 3 cm/s in countercurrent to the adsorption process. The desorption time was equal to the adsorption time. For this time, the desorption rate $a_m$-Des (Nl/kg) was determined, this value being critical to the quality of the adsorbent in hydrogen-PVA-installations.

The following molecular sieve zeolites were used for the tests:

Samples A

Granulates of Ca-zeolite A having a grain size of from 1 to 4 mm were produced with a Ca-content corresponding to 0.75CaO/$Al_2O_3$, in the absence of a binder in accordance with German Pat. No. 2,025,838. The active material had an apparent density according to DIN 8948 of 725 g/l.

Samples B

Granulates of type X zeolite were produced without a binder in accordance with German Pat. No. 2,016,838, the zeolite A-content amounting to 20% by weight and the $SiO_2/Al_2O_3$ ratio of the zeolite X-content amounting to 2.5. These Na-zeolite granulates (grain size 1 to 4 mm) were subjected to a standard Ca-exchange, samples difffering in their $CaO/Al_2O_3$-content being produced. The selective granulate had an apparent density of from 660 to 680 g/l.

Samples C

Zeolite X granulates still bonded with 10% of clay were produced, the Na-zeolite X powder having been subjected to a standard Ca exchange before the forming process. The Na-zeolite X powder was identical with that of the samples B. The active granulate had an apparent density of 650 g/l.

The results of the preliminary test are set out in Table 1. The partial pressures of the adsorbates in the preliminary tests correspond to those in hydrogen-rich reformer gases, so that this test provides a good insight into the quality of the samples investigated.

According to the results obtained, it is possible a zeolite X having a Ca-content of more than 0.5 $CaO/Al_2O_3$ in accordance with the invention can be used with greater advantage over the Ca zeolite A normally used in PVA-installations for producing high-purity hydrogen. It is surprising that, in addition to $N_2$ and CO, the non-polar argon and oxygen can also be advantageously removed using a Ca-exchange zolite X.

The suitability of Ca-zeolite X for the purposes of the invention was closely investigated in a semi-practical test which will be described with reference to the accompanying drawings, wherein:

FIG. 1 is a schematic flow sheet of a 4-adsorber PVA-installation, and

FIG. 2 is a pressure-time chart of the installation of FIG. 1.

Referring now more particularly to the drawings, each of the adsorbers of FIG. 1 had a volume of 35 dm$^3$.

In each case, adsorption was carried out at 16 bars (abs) and at a gas temperature of 20° C. while desorption was carried out at about 1.4 bars (abs), gas from the second expansion stage ($P_3$-$P_2$) being used for desorption.

The input gas always had the following composition: $H_2$: 72%, $CO_2$: 18%, $CH_4$: 5%, CO: 1.5%, $N_2$: 3.5% (% by volume). The water content amounted to less than 0.1 g/Nm$^3$.

Table 2 shows the test results obtained from a comparison test between Ca zeolite A (test 1) and Ca zeolite X (test 2).

To enable a comparison to be made, the ratio between the quantity of crude (feed-) gas and active carbon was left constant. The result of the test clearly shows the surprisingly high superiority of the Ca-zeolite X over the CaA zeolites hitherto used.

As shown in FIG. 2, the gas for desorbing adsorber C was obtained from the expansion stage $P_3 \rightarrow P_2$ of adsorber A. Since, based on the quantity of crude gas, the adsorber volume in test 2 was around 17% smaller than in test 1, the above pressure reduction would have to be theoretically increased by 17% in test 2 to obtain the same volume of rinsing gas. In fact, the expansion pressure of the rinsing gas had to be increased by 20% because, on account of the post-desorption effect of the adsorbates, less purified product gas can be removed per unit of pressure and volume with increasing pressure reduction.

In view of the greater rinsing gas pressure reduction of Example 2, a low final pressure was additionally obtained before the rinsing step ($P_1$), so that in addition smaller expansion losses arose through the smaller adsorber volume (based on the quantity of crude gas). By using the zeolite according to the invention, it was possible in Example 2 to obtain a hydrogen yield of 82.5% as against 78% in Example 1.

The zeolite according to the invention affords a major advantage in cases where so-called multiple-adsorber systems (DOS Nos. 26 24 346 and 28 23 211) comprising 7 to 10 adsorbers are used. In this system, pressure equalization takes place 3 to 4 times with an expansion phase in between for removal of the rinsing gas. As a result, a pressure difference between the last refill pressure and the pressure of the rinsing gas of only 0.2 to 0.5 bar is obtained. Accordingly, by reducing the overall adsorber volume using the zeolite according to the invention, it is possible, for the same yield of $H_2$, to save one refilling step and hence one adsorber. The resulting advantage in terms of investment costs is considerable.

TABLE 1

| | | | Adsorption-Desorption Test, 1 bar/25° C. | | | | |
|---|---|---|---|---|---|---|---|
| | | | Desorption rate in Nl of desorbate/kg of zeolite (am-Des) | | | | |
| | | $CaO/Al_2O_3$ Molar | Concentration of the adsorbate on entry in the adsorption process | | | | |
| | Samples | ratio | 20% $N_2$ | 50% $N_2$ | 10% CO | 20% argon | 20% $O_2$ |
| A | Ca-zeolite A | 0.7 | 2.5 | 6.0 | 5.1 | 0.3 | 0.7 |
| B | Na-Ca zeolite X without binder | 0 | 1.4 | 3.7 | 4.2 | 0.3 | 0.6 |
| | | 0.35 | 2.1 | 5.5 | — | — | — |
| | | 0.52 | 2.8 | 6.5 | — | — | — |
| | | 0.6 | 2.55 | 6.75 | — | — | — |
| | | 0.65 | 2.9 | 7.15 | — | — | — |
| | | 0.72 | 3.6 | 8.1 | — | — | — |
| | | 0.75 | 4.2 | 8.7 | — | — | — |
| | | 0.82 | 5.4 | 10 | 8.5 | 0.75 | 0.95 |
| | | 0.88 | 5.8 | 10.8 | — | — | — |
| | | 0.98 | 6.8 | 11.25 | — | — | — |
| C | Na-Ca zeolite X with binder | 0.8 | 4.5 | 7.7 | — | — | — |
| | | 0.91 | 5.0 | 8.6 | — | — | — |

TABLE 2

| | | PVA-Purifucation and Separation Test | | | |
|---|---|---|---|---|---|
| Test | Adsorber filling | Quantity of crude gas Nm³/h | Pressure reduction for rinsing gas bars | Quantity of product gas Nm³/h | Quantity of product gas $\frac{Nm^3/h}{kg\ of\ zeolite}$ | Residual $N_2$ content in the the product ppm vol. |
| 1 | 14.5 kg of Ca-Zeolite A (sample A) 6.2 kg of active carbon ("Supersorbon") | 8.6 | 5 | 4.83 | 0.333 | 5.0 |
| 2 | 12.4 kg of Ca-Zeolite (sample B) 0.82 of CaO/Al₂O₃ 7.3 kg of active carbon ("Supersorbon") | 10.25 | 6 | 6.09 | 0.49 | 3.5 |

It will be appreciated that the instant specification and examples are set forth by way of illustration and not limitation, and that various modifications and changes may be made without departing from the spirit and scope of the present invention.

I claim:

1. In the increase of the hydrogen content of a gas rich in hydrogen and additionally containing CO, $CH_4$ and $CO_2$ by contacting the gas with a zeolite which selectively absorbs the gases other than hydrogen to leave the non-absorbed gas enriched in hydrogen, and then desorbing the absorbed gases from the zeolite, the improvement which comprises employing as said zeolite Ca-zeolite X granulate in which at least about 50% of the Na initially present in the zeolite has been replaced by calcium.

2. A process as claimed in claim 1, wherein the zeolite has a $SiO_2/Al_2O_3$ molar ratio of about 2 to 3%.

3. A process as claimed in claim 1, wherein the zeolite granulate contains about 10 to 30% by weight of inactive binder and about 70 to 90% by weight of active Ca-zeolite X.

4. A process as claimed in claim 3, wherein the zeolite has a $SiO_2/Al_2O_3$ molar ratio of about 2 to 3% and the molar content of calcium in the zeolite amounts to between about 0.5 and $1.0CaO/Al_2O_3$.

5. A process as claimed in claim 1, wherein the molar content of calcium in the zeolite amounts to between about 0.5 and $1.0CaO/Al_2O_3$.

6. A process as claimed in claim 1, wherein the starting gas contains approximately 70–75% of hydrogen, 1–3% of CO, 2–5% of $CH_4$ and 15–17% of $CO_2$.

7. A process as claimed in claim 6, wherein the starting gas additionally contains 1–5% of nitrogen.

* * * * *